(12) United States Patent
Isoda (10) Patent No.: US 7,514,698 B2
(45) Date of Patent: Apr. 7, 2009

(54) RADIATION IMAGE CONVERSION PANEL AND PROCESS FOR PRODUCING THE SAME

(75) Inventor: Yuji Isoda, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/713,017

(22) Filed: Mar. 2, 2007

(65) Prior Publication Data

US 2007/0205380 A1   Sep. 6, 2007

(30) Foreign Application Priority Data

Mar. 2, 2006   (JP)   ............................. 2006-056206

(51) Int. Cl.
   *H05B 33/18*   (2006.01)
   *H05B 33/10*   (2006.01)
(52) U.S. Cl. ............................... 250/484.4; 250/370.11
(58) Field of Classification Search .............. 250/484.4, 250/370.11
   See application file for complete search history.

(56) References Cited

U.S. PATENT DOCUMENTS

2003/0047697 A1*  3/2003  Iwabuchi et al. ............ 250/584
2003/0155515 A1   8/2003  Moy et al.
2005/0048197 A1*  3/2005  Iwabuchi et al. ............... 427/65
2005/0051736 A1*  3/2005  Isoda et al. ............... 250/484.4
2005/0051746 A1*  3/2005  Iwabuchi et al. ............ 250/580

FOREIGN PATENT DOCUMENTS

JP   2003-50298 A   2/2003
JP   2005-69991 A   3/2005

OTHER PUBLICATIONS

European Search Report dated Jun. 14, 2007.

* cited by examiner

*Primary Examiner*—David P Porta
*Assistant Examiner*—Casey Bryant
(74) *Attorney, Agent, or Firm*—Sughrue Mion, PLLC (57) ABSTRACT

The radiation image conversion panel includes a phosphor layer formed by a vapor-phase deposition and solely formed of columnar crystals, a matrix layer formed under the phosphor layer, is substantially free of an activator of a phosphor, and has a columnar crystal region and an underlying non-columnar crystal region and a substrate which supports the matrix layer and the phosphor layer formed on the matrix layer. The process for producing the radiation image conversion panel forms on the substrate the matrix layer and forms the phosphor layer by the vapor-phase deposition. The formation of the phosphor layer is started after a crystal structure of an upper region of the matrix layer has changed from a non-columnar to a columnar.

7 Claims, 2 Drawing Sheets

RADIATION IMAGE CONVERSION PANEL AND PROCESS FOR PRODUCING THE SAME

The entire contents of documents cited in this specification are incorporated herein by reference.

BACKGROUND OF THE INVENTION

The present invention relates to a radiation image conversion panel that has a stimulable phosphor layer formed by a vapor-phase deposition method such as vacuum evaporation and which can reproduce a high-quality radiation image without point defects and any other substantial problems. The invention also relates to a process for producing this radiation image conversion panel.

Upon exposure to a radiation (e.g. X-rays, $\alpha$-rays, $\beta$-rays, $\gamma$-rays, electron beams, and ultraviolet rays), certain types of phosphors known in the art accumulate part of the energy of the applied radiation and, in response to subsequent application of exciting light such as visible light, they emit photostimulated luminescence in an amount that is associated with the accumulated energy. Called "storage phosphors" or "stimulable phosphors", those types of phosphors find use in medical and various other fields.

A known example of such use is a radiation image information recording and reproducing system that employs a radiation image conversion panel having a film (or layer) of the stimulable phosphor (which is hereinafter referred to as a phosphor layer). The radiation image conversion panel is hereinafter referred to simply as the conversion panel and is also called the stimulable phosphor panel (sheet). The system has already been commercialized by, for example, Fuji Photo Film Co., Ltd. under the trade name of FCR (Fuji Computed Radiography).

In that system, a subject such as a human body is irradiated with X-rays or the like to record radiation image information about the subject on the conversion panel (more specifically, the phosphor layer). After the radiation image information is thus recorded, the phosphor panel is scanned two-dimensionally with exciting light to emit photostimulated luminescence which, in turn, is read photoelectrically to yield an image signal. Then, an image reproduced on the basis of the image signal is output as the radiation image of the subject, typically to a display device such as CRT or on a recording material such as a photosensitive material.

The conversion panel is typically prepared by the following method: Powder of a stimulable phosphor is dispersed in a solvent containing a binder and other necessary ingredients to make a coating solution, which is applied to a panel-shaped support (substrate) made of glass or a resin, with the applied coating being subsequently dried.

Also known are conversion panels which are prepared by forming a phosphor layer on a substrate through vapor-phase deposition (vapor-phase film deposition techniques) or vacuum deposition (vacuum film deposition techniques) such as vacuum evaporation and sputtering. The phosphor layer formed by such vapor-phase deposition has superior characteristics in that it is formed in vacuo and hence has low impurity levels and that being substantially free of any ingredients other than the stimulable phosphor as exemplified by a binder, the phosphor layer has not only small scatter in performance but also features very highly efficient luminescence.

When forming the phosphor layer by the vapor-phase deposition, various efforts are being made with a view to improving the characteristics of the conversion panel.

Take, for example, a conversion panel disclosed in JP 2003-50298 A; this panel comprises a substrate and a phosphor layer, between which is provided a matrix layer of stimulable phosphor in the absence of its activator, whereby the phosphor layer is not only improved in adhesion but also grown to have an advantageous columnar structure so as to produce a radiation image that is satisfactory in sharpness, graininess and other properties.

In a conversion panel disclosed in JP 2005-69991 A, the phosphor layer is composed of a lower sub-layer having a spherical crystal structure and an upper sub-layer having a columnar crystal structure, to thereby improve the adhesion between the substrate and the phosphor layer; in addition, the light reflecting characteristics of the lower sub-layer having a spherical crystal structure are combined with the improvement that its presence adds to the columnar nature of the upper sub-layer, thereby achieving a significant improvement in sensitivity.

SUMMARY OF THE INVENTION

The conversion panels disclosed in those patent references feature satisfactory adhesion of the phosphor layer and they also provide good sharpness, graininess, sensitivity and other desired properties.

However, the requirements for the characteristics of conversion panels have become more strict than ever before; for example, it is desired to further suppress the abnormal crystals in the stimulable phosphor which would otherwise cause point defects in a radiation image that is reproduced.

An object of the present invention is to provide a radiation image conversion panel that has so few point defects due to abnormal crystals in the stimulable phosphor that it can produce a high-quality radiation image.

Another object of the present invention is to provide a process for producing this radiation image conversion panel.

In order to achieve the above-mentioned first object, the present invention provides a radiation image conversion panel comprising:

a stimulable phosphor layer which is formed by a vapor-phase deposition and is solely formed of columnar crystals;

a matrix layer which is formed under the stimulable phosphor layer, is substantially free of an activator of a stimulable phosphor, and has a columnar crystal region and an underlying non-columnar crystal region; and a substrate which supports the matrix layer and the stimulable phosphor layer formed on the matrix layer.

The stimulable phosphor layer preferably has an activator concentration-increasing region in which a concentration of the activator increases progressively from an interface with the matrix layer toward an outer surface of the stimulable phosphor layer.

The activator concentration-increasing region preferably has a thickness ranging from 0.5 µm to a value corresponding to a thickness of the stimulable phosphor layer.

A rate at which the concentration of the activator changes in the activator concentration-increasing region is preferably between $1\times10^{-7}/\mu m$ and $5\times10^{-4}/\mu m$.

The underlying non-columnar crystal region of the matrix layer is preferably a spherical crystal layer having a spherical crystal structure.

Preferably, the radiation image conversion panel further comprises a protective layer having sufficient moisture resistance which is formed on the stimulable phosphor layer.

In order to achieve the above-mentioned second object, the present invention also provides a process for producing a radiation image conversion panel having a stimulable phosphor layer, comprising:

forming on or above a substrate a matrix layer which is substantially free of an activator of a stimulable phosphor; and forming the stimulable phosphor layer by a vapor-phase deposition, wherein formation of the stimulable phosphor layer is started after a crystal structure of an upper region of the matrix layer has changed from a non-columnar to a columnar.

In a preferred embodiment of the process for producing a radiation image conversion panel, at a time when the formation of the stimulable phosphor layer has started, the activator of the stimulable phosphor is deposited in a smaller amount than a required value and thereafter the activator is deposited in a progressively increased amount until the required value is reached.

According to the present invention having the features described above, the stimulable phosphor layer is formed after columnar crystals are formed in the matrix layer, so abnormal crystals that might grow on the particles of the activator as nuclei and those which would otherwise result from the fluctuation of the evaporating stream upon opening the shutter for starting the evaporation of the activator can be effectively prevented from being generated so as to accomplish a radiation image conversion panel that can produce a high-quality radiation image free from point defects.

DETAILED DESCRIPTION OF THE PREFERRED EMBODIMENTS

On the pages that follow, the radiation image conversion panel and the process for producing this radiation image conversion panel according to the present invention are described in detail with reference to the preferred embodiments depicted in the accompanying drawings.

Figure 1:
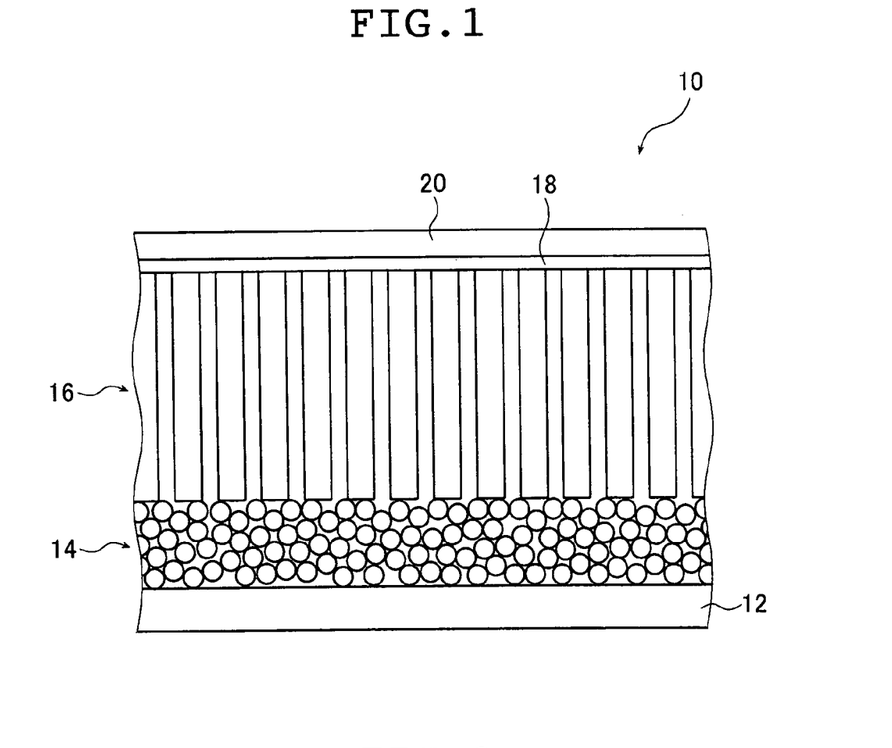
FIG. 1 is a schematic diagram of an embodiment of the radiation image conversion panel of the present invention.

FIG. 1 shows in concept an embodiment of the radiation image conversion panel of the present invention.

A radiation image conversion panel of the present invention which is generally indicated by 10 (hereinafter referred to as a conversion panel 10) comprises a substrate 12, a (stimulable) phosphor layer formed of a stimulable phosphor, and a matrix layer formed under the phosphor layer (on the side closer to the substrate 12). Note here that the matrix layer is a layer that is substantially free of the activator of the stimulable phosphor, namely, a layer having the same composition as the stimulable phosphor except that its activator (or a film-forming material component for the activator) is absent.

Note also that the conversion panel 10 of the present invention has a spherical crystal layer 14 having a spherical crystal structure (which is sometimes referred to as a lump layer), a columnar crystal layer 16 having a columnar crystal structure that overlies the spherical crystal layer 14, and a protective layer 20 that covers the entire surface of the columnar crystal layer 16 (phosphor layer) and is adhered to this columnar crystal layer 16 (as well as the substrate 12) by means of an adhesive layer 18.

It should be noted here that the matrix layer occupies not only the spherical crystal layer 14 but also the lower part of the columnar crystal layer 16 whereas the phosphor layer is formed solely on top of the matrix layer in the columnar crystal layer 16.

Thus, the spherical crystal layer 14 is composed of the matrix layer alone whereas the columnar crystal layer 16 is composed of the matrix layer in its lower part and the phosphor layer in the upper part. In other words, the matrix layer consists of two regions, one of the spherical crystal layer 14 and the other of the columnar crystal layer 16, whereas the phosphor layer is formed solely in the columnar crystal layer 16 (i.e., the phosphor layer is composed solely of a columnar crystal structure).

Note also that the radiation image conversion panel of the present invention is by no means limited to the structural design described above and a variety of designs are applicable as long as it satisfies the two requirements of layer arrangement, one being that it should have the matrix and phosphor layers defined above, and the other being that it should have the spherical crystal layer 14 and the columnar crystal layer 16.

For example, the adhesive layer 18 and the protective layer 20 may be omitted if the spherical crystal layer 14 and the columnar crystal layer 16 (the matrix and phosphor layers) have adequate moisture barrier properties.

There is no particular limitation on the substrate 12 of the conversion panel 10 of the present invention and various types as used in conventionally known radiation image conversion panels are usable.

Exemplary types include plastic plates and sheets (films) made of, for example, cellulose acetate, polyester, polyethylene terephthalate, polyamide, polyimide, triacetate, and polycarbonate; glass plates and sheets made of, for example, quartz glass, alkali-free glass, soda glass, heat-resistant glass (e.g., Pyrex™); metal plates and sheets made of metals such as aluminum, iron, copper and chromium; and plates and sheets obtained by forming a coating layer such as a metal oxide layer on the surfaces of such metal plates and sheets.

If desired, the substrate 12 may have on its surface a protective layer that protects it, a reflective layer that reflects photostimulated luminescence, and even a protective layer that protects the reflective layer. In this case, the matrix layer (spherical crystal layer 14) is formed on top of these layers.

The conversion panel 10 of the present invention has the matrix layer which is substantially free of the activator for the stimulable phosphor and the phosphor layer which is formed of the stimulable phosphor. Note also that the conversion panel 10 of the present invention has the spherical crystal layer 14 and the columnar crystal layer 16, the former being solely formed of the matrix layer and the latter being formed of both the matrix and phosphor layers. As used herein, the expression "substantially free of the activator" means that not more than $1.0 \times 10^{-6}$ ppm of the activator is present, preferably none.

The phosphor layer is a layer formed of the stimulable phosphor whereas the matrix layer is a layer including no activator of the stimulable phosphor. Take, for example, the case where the stimulable phosphor is CsBr:Eu, with Eu being present as its activator, the matrix layer is solely composed of CsBr whereas the phosphor layer is formed of CsBr:Eu (only the phosphor layer contains Eu).

Since the matrix layer and the spherical crystal layer 14 each work as a stress-relaxing layer, the provision of these layers contributes to a better adhesion of the phosphor layer.

The conversion panel 10 has no particular limitation on the thickness of the matrix layer but it is preferably between 1 μm and 350 μm, with the range of 10-100 μm being particularly preferred.

Adjusting the thickness of the matrix layer to lie within those ranges is preferred from various viewpoints including the adhesion of the phosphor layer and the quality of the image that can be produced.

The thickness of the phosphor layer also is not limited in any particular way but it is preferably between 100 μm and 1500 μm, with the range of 500-1000 μm being particularly preferred.

Adjusting the thickness of the phosphor layer to lie within those ranges is preferred from various viewpoints including the absorption of X-rays and the sharpness of the image that can be produced.

Speaking further of the conversion panel 10 of the present invention, the phosphor layer preferably has such a region that the concentration of the activator increases progressively from the interface with the matrix layer toward the outer surface (away from the substrate 12), such region being hereinafter called the "concentration-increasing region" for the sake of convenience). To be more specific, if the stimulable phosphor is CsBr:Eu mentioned above, the phosphor layer preferably has such a region that the concentration of the activator Eu increases progressively from the interface with the matrix layer toward the outer surface.

Provision of such region helps prevent various phenomena including the abnormal growth of crystals that might otherwise result from the bumping and the like of the film-forming material for the activator and the generation of foreign matter in the boundary region between the matrix layer and the phosphor layer; as a result, the generation of point defects and other problems due to those phenomena can be prevented more effectively to produce a high-quality radiation image. What is more, in the absence of any clear interface between the matrix and phosphor layers at which the concentration of the activator rises abruptly, the phosphor layer can have even better adhesion.

If the conversion panel 10 has the concentration-increasing region, its thickness is not limited in any particular way but it preferably ranges from 0.5 μm to the value corresponding to the thickness of the phosphor layer. In other words, the phosphor layer in the present invention may be the concentration-increasing region throughout.

By adjusting the concentration-increasing region to lie within the stated range, even more preferred results can be obtained from various viewpoints including the prevention of such phenomena as the abnormal crystal growth and the generation of foreign matter in the boundary region between the matrix and phosphor layers, as well as the improvement in the adhesion of the phosphor layer.

There is also no particular limitation on the rate at which the concentration of the activator varies in the concentration-increasing region but a preferred range is between $1 \times 10^{-7}$/μm and $5 \times 10^{-4}$/μm.

Adjusting the rate of concentration variation to lie within the stated range is preferred from various viewpoints including the prevention of such phenomena as the abnormal crystal growth and the generation of foreign matter in the boundary region between the matrix and phosphor layers, as well as the improvement in the adhesion of the phosphor layer.

As used herein, the rate at which the concentration of the activator varies in the concentration-increasing region is the value calculated by dividing the concentration of the activator in the phosphor layer by the thickness of the concentration-increasing region in μm. The concentration of the activator is the molarity ratio of the activator in the stimulable phosphor to the phosphor per se; if the stimulable phosphor is CsBr:Eu, the concentration of the activator is the molarity ratio of Eu to Cs.

The concentration of the activator and other components of the phosphor layer may be determined by various known methods; one example is the ICP (inductively coupled plasma) method in which the phosphor layer is sliced on a suitable pitch of, say, 10 μm in the direction of the film's plane and subjected to ICP emission spectrometry, and in another method, cross sections are taken of the phosphor layer with an FIB (focused ion beam) and the molarity ratio of the activator to phosphor is determined with an SIMS (secondary ion mass spectrometer) in the direction of its thickness.

In the present invention, the thickness ratio between the matrix layer and the phosphor layer is not limited in any particular way, either; however, the ratio of the matrix to phosphor layer is preferably between 0.001 and 10, with the range of 0.01-0.5 being particularly preferred.

Adjusting the thickness ratio between the matrix layer and the phosphor layer to lie within those ranges is preferred from various viewpoints including the adhesion of the matrix and phosphor layers (in particular, the phosphor layer) and the quality of the image that can be produced.

The spherical crystals that form the spherical crystal layer 14 in the conversion panel 10 of the present invention are such crystals that the ratio of the minor to major axis of the crystal grains is greater than 0.5. As will be mentioned later, in the present invention, the spherical crystal layer 14 and the columnar crystal layer 16 (the matrix and phosphor layers) are formed (deposited) by vapor-phase deposition, and in the spherical crystal layer 14 of the present invention, the spherical crystals are preferably such that the ratio of their diameter in a direction perpendicular to the direction of crystal growth by vapor-phase (film) deposition (i.e., in the plane direction of the spherical crystal layer 14) to the diameter in the direction of crystal growth (i.e., in the direction of the thickness of the spherical crystal layer 14) is greater than 0.5 but smaller than 2.

It is also preferred that the spherical crystals under consideration have an average grain size of 1-10 μm.

In the conversion panel 10 of the present invention, the spherical crystal layer 14 comprises an aggregate of spherical crystals, at least 50% of which are preferably occupied by spherical crystal grains having the above-defined ranges of the minor-to-major axis ratio and the average grain size.

The thickness of the spherical crystal layer 14 is not limited in any particular way but the range of 10-100 μm is preferred.

Adjusting the thickness of the spherical crystal layer 14 to lie within this range is preferred from various viewpoints including the adhesion of the spherical crystal layer 14 and the columnar crystal layer 16 and the PSL (photostimulated luminescence) sensitivity.

In the conversion panel 10 of the present invention, the spherical crystal layer 14 is overlaid with the columnar crystal layer 16.

The columnar crystal layer 16 is a layer that is formed of crystals that have grown as independent columns. The average diameter of these columnar crystals is not limited in any particular way but the range of 1-10 μm is preferred.

The thickness of the columnar crystal layer 16 also is not limited in any particular way but it is preferably between 100 μm and 1500 μm, with the range of 500-1000 μm being particularly preferred.

Adjusting the thickness of the columnar crystal layer 16 to lie within these ranges is preferred from various viewpoints including image sharpness.

In the conversion panel 10 of the present invention, the columnar crystal layer 16 is composed of the matrix layer in its lower part (on the side closer to the spherical crystal layer 14) and the phosphor layer in the upper part. In other words, the matrix layer comprises two regions, the spherical crystal layer and the columnar crystal layer, whereas the phosphor layer is solely formed of columnar crystals.

In the columnar crystal layer 16, the thickness ratio between the matrix layer and the phosphor layer is not limited in any particular way but when expressed by the ratio of the matrix to phosphor layer, it is preferably between 0.001 and 10, with the range of 0.01-0.5 being particularly preferred.

Ensuring the thickness ratio between the matrix and phosphor layers in the columnar crystal layer 16 to lie within those ranges is preferred for various reasons, one of which is that the abnormal crystal growth that might otherwise result from the particles of the activator can be prevented more effectively and other reasons are related to the adhesion of the matrix and phosphor layers, as well as the quality of the image that can be produced.

In the conversion panel 10 of the present invention, the total thickness of the spherical crystal layer 14 and the columnar crystal layer 16 (namely, the sum thickness of the matrix and phosphor layers) is not limited in any particular way; however, for various reasons including the achievement of better PSL characteristics, the range of 100-1000 μm is preferred, with the range of 200-700 μm being particularly preferred.

Here again, there is no particular limitation on the thickness ratio between the spherical crystal layer 14 and the columnar crystal layer 16 but when expressed by the ratio of the spherical crystal layer 14 to the columnar crystal layer 16, it is preferably between 0.01 and 0.5. Adjusting the thickness ratio between the two layers to lie within this range is preferred from various viewpoints including the adhesion of the spherical crystal layer 14 and the columnar crystal layer 16 and the quality of the image that can be produced.

In the present invention, various known materials may be used for the stimulable phosphor (storage phosphor) constituting the phosphor layer. For example, alkali halide-based stimulable phosphors represented by the general formula "$M^I X \cdot a M^{II} X'_2 \cdot b M^{III} X''_3 : cA$" are disclosed in JP 61-72087 A and advantageously used. In this formula, $M^I$ represents at least one element selected from the group consisting of Li, Na, K, Rb, and Cs. $M^{II}$ represents at least one divalent metal selected from the group consisting of Be, Mg, Ca, Sr, Ba, Zn, Cd, Cu, and Ni. $M^{III}$ represents at least one trivalent metal selected from the group consisting of Sc, Y, La, Ce, Pr, Nd, Pm, Sm, Eu, Gd, Tb, Dy, Ho, Er, Tm, Yb, Lu, Al, Ga, and In. X, X', and X" each represent at least one element selected from the group consisting of F, Cl, Br, and I. A represents at least one element selected from the group consisting of Eu, Tb, Ce, Tm, Dy, Pr, Ho, Nd, Yb, Er, Gd, Lu, Sm, Y, Tl, Na, Ag, Cu, Bi, and Mg, $0 \leq a < 0.5$, $0 \leq b < 0.5$, and $0 < c < 0.2$.

Of these, alkali halide-based stimulable phosphors in which $M^I$ contains at least Cs, X contains at least Br, and A is Eu or Bi are preferred, and stimulable phosphors represented by the general formula "CsBr:Eu" are more preferred because they have excellent photostimulated luminescence characteristics and the effect of the present invention is advantageously achieved.

Various other stimulable phosphors disclosed in, for example, U.S. Pat. No. 3,859,527, JP 55-12142 A, JP 55-12144 A, JP 55-12145 A, JP 56-116777 A, JP 58-69281 A, JP 58-206678 A, and JP 59-38278 A and JP 59-75200 A may also be advantageously used.

Further referring to the conversion panel 10 of the present invention, the matrix layer and the phosphor layer, namely, the spherical crystal layer 14 and the columnar crystal layer 16 are formed by various vapor-phase deposition (vapor-phase film deposition techniques) or vacuum deposition (vacuum film deposition techniques) including vacuum evaporation, sputtering, and CVD (chemical vapor deposition).

Among these techniques, vacuum evaporation is a preferred method for forming the matrix and phosphor layers from various viewpoints such as productivity. It is particularly preferred to form the matrix and phosphor layers by two-source (multi-source) vacuum evaporation in which two film-forming materials, one for the phosphor and the other for the activator, are independently heated to evaporate; to be more specific, the film-forming material for the phosphor is first vapor deposited until a desired thickness of the matrix layer is formed; then, the film-forming material for the activator is vapor deposited to form the matrix and phosphor layers. Needless to say, the amount in which the activator is evaporated should be controlled in such a way that the concentration of the activator in the phosphor layer reaches the intended value.

Take, for example, the case of using CsBr:Eu as the stimulable phosphor. In this case, cesium bromide (CsBr) is used as the film-forming material for the phosphor and europium bromide ($EuBr_x$; x is usually from 2 to 3, with 2 being preferred) is used as the film-forming material for the activator. The process starts with depositing the vapor of cesium bromide to form the matrix layer until it acquires the desired thickness; then, evaporation of europium bromide gets started and continues until the phosphor layer is formed.

As already mentioned, the present invention is characterized in that the matrix layer is formed in both the spherical crystal layer 14 and the columnar crystal layer 16 whereas the phosphor layer is formed solely in the columnar crystal layer 16.

In other words, the film-forming material for the phosphor layer starts to be evaporated only after the crystal structure of the matrix layer has changed from the spherical to the columnar.

According to the studies made by the present inventor, it has been found that in the formation of a phosphor layer by vacuum evaporation, in particular, the formation of a phosphor layer comprising the aforementioned alkali halide-based stimulable phosphor which is advantageous for the present invention, and most specifically, a phosphor layer comprising CsBr:Eu, the early stage of evaporation may, under certain conditions of film deposition, involve the growth of spherical crystals to form a spherical crystal layer, and then a columnar crystal structure is created. It should be noted here that the activator, being present in a very small amount in the phosphor layer, will not affect the crystal structure, so that even in the case of evaporating only the film-forming material for the phosphor that provides the matrix layer, the same result will occur, i.e., a spherical crystal layer is first formed in the process of evaporation and then a columnar crystal layer is created.

It should also be mentioned that whether the spherical crystal layer is formed or not and the thickness of the spherical crystal layer (the amount of film deposition until the change from the spherical to the columnar crystal structure occurs) can be controlled by adjusting the pressure (degree of vacuum) during evaporation and/or the temperature at which the film-forming material is heated. Generally speaking, the more easily the film-forming material tends to evaporate, the more difficult it will be to form the spherical crystal layer and the less is the spherical crystal layer that is deposited.

Therefore, if one appropriately sets the pressure during evaporation, the temperature at which the film-forming material for the phosphor is heated and other parameters according to the types of the stimulable phosphor, the film-forming materials used and other factors, the spherical crystal layer 14 can be formed in the matrix layer, which can be further processed to assume the columnar crystal structure. Hence, if the film-forming material for the activator starts to evaporate after the crystal structure of the matrix layer has changed from the spherical to the columnar, one can prepare the conversion panel of the present invention which, as shown in FIG. 1, has the matrix and phosphor layers, the phosphor layer being formed solely in the columnar crystal layer 16 and the matrix layer being formed in the spherical crystal layer 14 and in the lower part of the columnar crystal layer 16.

If desired, the phosphor layer may be formed in such a way that at the beginning of the process, the amount in which the film-forming material for the activator is vapor deposited (i.e., evaporated) is adjusted to be smaller than the required amount of the activator and that as the formation of the phosphor layer progresses, the amount is gradually increased to eventually provide the phosphor layer with the activator's concentration-increasing region already defined above.

Consider, for example, the case of performing vacuum evaporation by resistance heating; in order to create the activator's concentration-increasing region, the power supplied to a crucible for resistance heating may be set to be lower than the required value and then increased gradually.

As already mentioned, depending on the conditions employed to deposit the stimulable phosphor by vacuum evaporation, the crystal structure of the layer being formed will change from the spherical to the columnar. In other words, the spherical crystal structure is in a state that features unstable crystal growth. If the formation of the phosphor layer, namely, the evaporation of the activator is started while the matrix layer is still assuming the spherical crystal structure, the vapor of the activator is deposited on the unstably growing crystals, so the particles of the activator will provide the start point for the growth of abnormal crystals.

In the common process of vacuum evaporation, the film-forming material is preliminarily heated to melt before the shutter is opened to start evaporation. The vacuum evaporation to be performed in the present invention involves the formation of both the matrix layer and the phosphor layer; if the evaporation of the activator is started by opening the shutter while the crystals that are growing are spherical and still unstable, the evaporating stream is fluctuated by the opening of the shutter and the crystal growth is adversely affected, again leading to the growth of abnormal crystals.

On the other hand, in the present invention, the phosphor layer is formed only after the matrix layer has assumed the columnar crystal structure. In other words, the evaporation of the activator is started after the crystal growth in the matrix layer has stabilized. This helps prevent the generation of abnormal crystals on the particles of the activator that serve as nuclei. In addition, even if the opening of the shutter causes the evaporating stream to fluctuate, the growth of the crystals that have assumed the columnar structure is stable enough to prevent the generation of abnormal crystals that would otherwise occur from that fluctuation. As a consequence, the conversion panel 10 of the present invention can produce a high-quality radiation image that is free from point defects and any other flaws that might otherwise result from abnormal crystals. In addition, if the concentration-increasing region is formed as described above, problems such as the foreign matter that would otherwise occur at the interface between the matrix layer and the phosphor layer can be prevented to produce a radiation image of even better quality.

Furthermore, since the formation of the phosphor layer is started in the present invention only after the growth of columnar crystals in the matrix layer has stabilized, the interface between the matrix layer and the phosphor layer is found within the stabilized columnar crystal layer 16. This fact, combined with the presence of the matrix layer and the spherical crystal layer, contributes to an even better adhesion of the phosphor layer. The adhesion of the phosphor layer can be further improved by forming the concentration-increasing region in the manner already described above.

In the present invention, there is no particular limitation on the heating method that can be employed in vacuum evaporation and the matrix and phosphor layers may be formed by electron beam heating using an electron gun or the like, or by resistance heating. If the matrix and phosphor layers are to be formed by multi-source vacuum evaporation, all film-forming materials may be heated to evaporate by the same heating means (such as electron beam heating). Alternatively, the film-forming material for the phosphor may be heated to evaporate by electron beam heating while the film-forming material for the activator, which is present in a very small amount, may be heated to evaporate by resistance heating.

There is also no particular limitation on the conditions (of film deposition) under which the matrix and phosphor layers are to be formed and they may be determined as appropriate for the type of the vapor-phase (film) deposition method used, the film forming materials used, the heating means, and other factors.

If desired, the matrix and phosphor layers formed (i.e., the spherical crystal layer 14 and the columnar crystal layer 16) may be heated at not more than 300° C., preferably not more than 200° C. by a suitable method such as heating the substrate during film deposition.

The conversion panel 10 of the present invention is further described below. If the phosphor layer 14 comprising any one of the aforementioned various stimulable phosphors, in particular, alkali halide-based stimulable phosphors, more specifically, stimulable phosphors represented by the general formula CsX:Eu set forth above, and most specifically CsBr:Eu, is to be formed by vacuum evaporation, a preferred procedure comprises first evacuating the system to a high degree of vacuum, then introducing an argon gas, a nitrogen gas or the like into the system to achieve a degree of vacuum between about 0.01 Pa and 3 Pa (which is hereinafter referred to as medium vacuum for the sake of convenience), and heating the film-forming materials by resistance heating or the like to perform vacuum evaporation under such medium vacuum.

As already mentioned, the conversion panel 10 of the present invention has the columnar crystal layer 16 formed on top of the spherical crystal layer 14, and the columnar crystal layer 16 that is formed by performing film deposition under the medium vacuum, in particular, the phosphor layer comprising an alkali halide-based stimulable phosphor such as CsBr:Eu has an especially satisfactory columnar crystal structure and is preferred in such terms as the PSL characteristics and the sharpness of the image that can be produced. It has already been noted that by adjusting the conditions of evaporation, the thickness of the matrix layer at which the spherical crystal layer 14 turns to the columnar crystal layer 16 can be controlled.

When the matrix and phosphor layers (i.e., the spherical crystal layer 14 and the columnar crystal layer 16) have been thus formed on the substrate 12, annealing is optionally performed.

It is also preferred to clean the surface of the substrate 12 by means of plasma or the like prior to the formation of the matrix and phosphor layers on the substrate 12.

In its preferred embodiment, the illustrated conversion panel 10 has the protective layer 20 that covers the entire surface of the columnar crystal layer 16 (phosphor layer) to hermetically seal it as well as the spherical crystal layer 14 (the matrix and phosphor layers).

The stimulable phosphors, in particular, the aforementioned alkali halide-based stimulable phosphors that are formed by the vapor-phase (film) deposition process are highly hygroscopic and will readily deteriorate upon absorbing moisture.

Therefore, in order to prevent the moisture absorption of the phosphor layer, it is preferable that, as shown in FIG. 1, the conversion panel 10 of the present invention be provided with the protective layer 20 that has moisture resistance (water impermeability) and entirely covers the spherical crystal layer 14 and the columnar crystal layer 16 to hermetically seal them.

Various types of material may be used for the protective layer 20 without any particular limitation as long as the material has sufficient moisture resistance.

For example, the protective layer 20 is formed of 3 sub-layers on a polyethylene terephthalate (PET) film: an $SiO_2$ film; a hybrid sub-layer of $SiO_2$ and polyvinyl alcohol (PVA); and an $SiO_2$ film. For formation of the protective layer 20 having 3 sub-layers of $SiO_2$ film/hybrid sub-layer of $SiO_2$ and PVA/$SiO_2$ film on the PET film, the $SiO_2$ films may be formed through sputtering and the hybrid sub-layer of $SiO_2$ and PVA may be formed through a sol-gel process, for example. The hybrid sub-layer is preferably formed to have a ratio of PVA to $SiO_2$ of 1:1.

Other examples of the material that may be preferably used for the protective layer 20 include a glass plate (film); a film of resin such as polyethylene terephthalate or polycarbonate; and a film having an inorganic substance such as $SiO_2$, $Al_2O_3$, or SiC deposited on the resin film.

To construct the conversion panel 10 of the present invention, the spherical crystal layer 14 and the columnar crystal layer 16 are entirely covered by the protective layer 20 that surrounds the entire circumferences of the two crystal layers and an adhesive layer 18 is applied to adhere the protective layer 20 to the substrate 12, whereby the protective layer 20 entirely covers the spherical crystal layer 14 and the columnar crystal layer 16 to hermetically seal them.

However, in a more preferred embodiment, the adhesive layer 18 is applied not only between the substrate 12 and the protective layer 20 but also to the surface of the columnar crystal layer 16 as shown in FIG. 1, so that the protective layer 20 is also adhered to the columnar crystal layer 16. This structural design helps prevent such problems as the floating of the protective layer 20, thus providing a highly durable conversion panel 10 that features even better mechanical strength.

The adhesive layer 18 for the protective layer 20 is not limited in any particular way and various types can be employed as long as they have sufficient adhesive power. However, if the adhesive layer 18 is to be additionally provided on the surface of the columnar crystal layer 16, it must have such optical characteristics as to permit sufficient transmission of photostimulated luminescence and exciting light.

Figure 2:
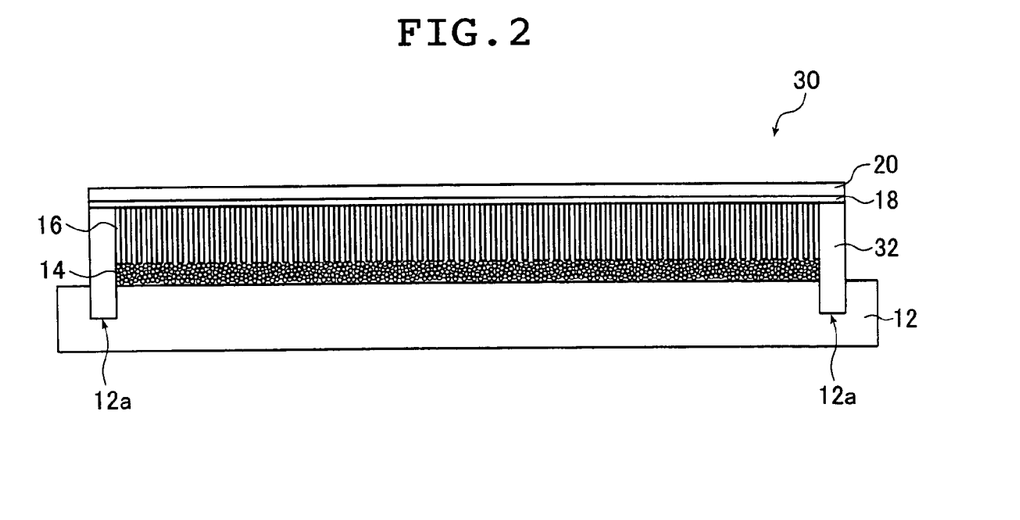
FIG. 2 is a schematic diagram of another embodiment of the radiation image conversion panel of the present invention.
Figure 3:
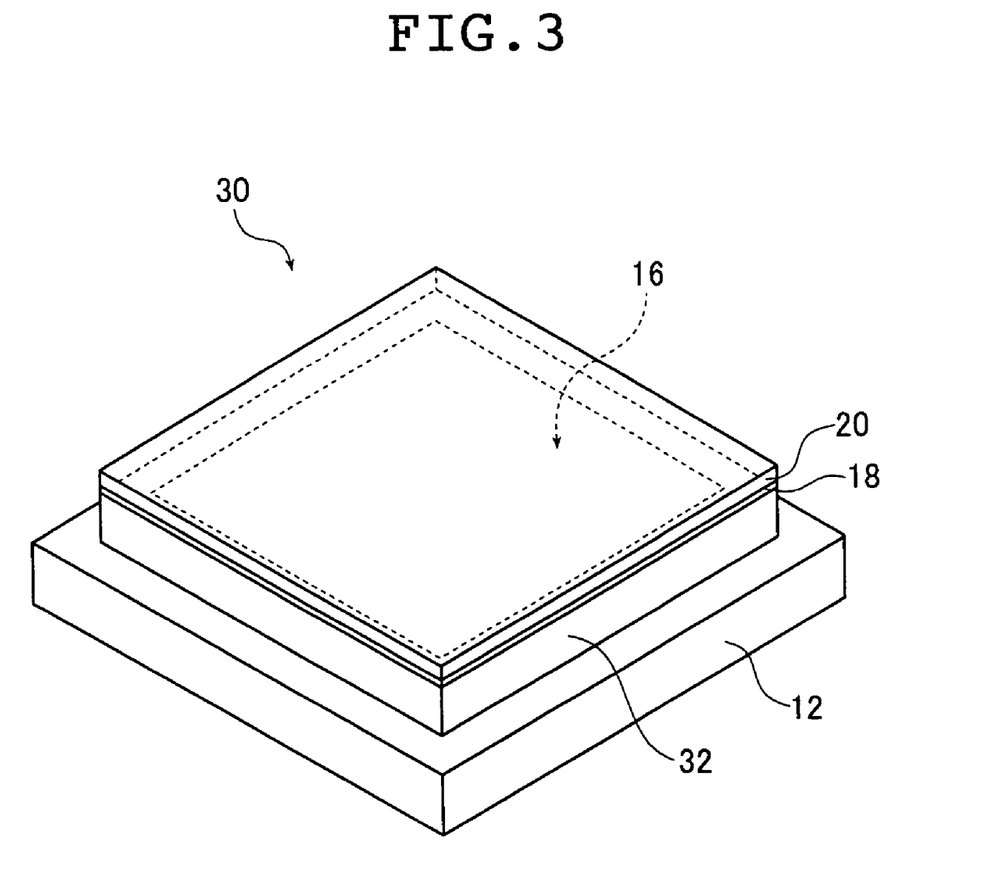
FIG. 3 is a perspective view showing in concept the radiation image conversion panel illustrated in FIG. 2.

Another preferred embodiment of the present invention is shown in FIGS. 2 and 3. A (radiation image) conversion panel 30 in those Figures has a frame member 32 (such as a square or rectangular frame) that surrounds the spherical crystal layer 14 and the columnar crystal layer 16 in a direction parallel to the plane of the substrate 12, and the protective layer 20 is adhered to the frame member 32 (and optionally the columnar crystal layer 16) such that the columnar crystal layer 16 and all other elements are entirely sealed hermetically.

To produce this conversion panel 30, the frame member 32 is first fixed to the substrate 12. In the preferred embodiment shown in FIG. 2, a groove 12a is formed in the surface of the substrate 12 and the frame member 32 is inserted into the groove 12a so that it is fixed to the substrate 12. This structural design is preferable since it not only improves the precision in the position of the frame member 32 but also provides greater ease in its positioning and other operations.

Of course, the present invention is by no means limited to this embodiment and the frame member 32 may be fixed to the substrate 12 without providing the groove 12a. The frame member 32 can also be fixed by various other methods depending on the materials and shapes of the substrate 12 and the frame member 32 and they include the use of an adhesive, the use of a solder, and the fitting into the groove 12a if it is formed in the surface of the substrate 12.

In the next step, with a mask applied, a suitable vapor-phase deposition such as vacuum evaporation is applied to form the spherical crystal layer 14 and the columnar crystal layer 16 (both the matrix and phosphor layers) within the region surrounded by the frame member 32.

When the formation of the columnar crystal layer 16 ends, annealing is optionally performed before the adhesive layer 18 is formed on top of the frame member 32 and both the frame member 32 and the columnar crystal layer 16 are covered with the protective layer 20, which is adhered to the frame member 32 by heat lamination or the like, whereupon the spherical crystal layer 14 and the columnar crystal layer 16 are entirely covered with the combination of the frame member 32 and the protective layer 20 so that they are hermetically sealed to produce the conversion panel 30. Here again, the upper surface of the frame member 32 is not the only area that the adhesive layer 18 is applied to and, as shown in FIG. 2, it is preferably provided on the surface of the columnar crystal layer 16, too, so that the latter is adhered to the protective layer 20 by means of the adhesive layer 18. This is the same case as the embodiment shown in FIG. 1.

By providing this frame member 32 and adhering the protective layer 20 to it, the surface of the columnar crystal layer 16 and the adhering surface of the protective layer 20 as the latter seals the columnar crystal layer 16 can be made generally flush with each other and, hence, sealing by the protective layer 20 can be accomplished more easily and without damaging either of the two crystal layers.

While the radiation image conversion panel and the process for producing the radiation image conversion panel according to the present invention have been described above in detail, the present invention is by no means limited to the foregoing embodiments and it should be understood that various improvements and modifications can of course be made without departing from the scope and spirit of the invention.

EXAMPLES

On the following pages, the present invention is described in greater detail with reference to specific examples. It should of course be understood that the present invention is by no means limited to the following examples.

Example 1

Using europium bromide and cesium bromide as film-forming materials for the activator and the phosphor, respectively, two-source vacuum evaporation was carried out to prepare a conversion panel of the type shown in FIG. 1 which is generally indicated by 10 and has a matrix layer and a phosphor layer (a spherical crystal layer 14 and a columnar crystal layer 16).

First, an aluminum substrate 12 having an area of 450×450 mm was set on a substrate holder in a vacuum evaporation apparatus; in addition, the respective film-forming materials were set in specified positions and the surface of the substrate 12 was masked such that films would be deposited in the center area of the substrate 12 measuring 430×430 mm. The substrate holder was equipped with a heater and a sheet that would conduct heat from the heater. The substrate was fixed by being pressed in such a way that its backside (where no phosphor layer would be formed) was entirely brought into intimate contact with the heat conductive sheet.

The film forming materials were heated in a resistance heating apparatus using tantalum crucibles and a DC source capable of outputting a power of 6 kW. Installed above the crucibles was a shutter for shielding against the film-forming material having evaporated therefrom. The crucible accommodating the film-forming material for the phosphor was furnished with a temperature measuring means.

After setting the substrate on its holder, the vacuum chamber was closed and switched on to perform evacuation using a diffusion pump and a cryogenic coil. The shutter was in the closed state.

When the degree of vacuum had reached $8\times10^{-4}$ Pa, argon gas was introduced into the vacuum chamber to adjust the degree of vacuum to 0.75 Pa; then, the DC source was driven so that an electric current was passed to the crucibles to melt the film forming materials they contained. Cesium bromide was melted at 670° C. As for europium bromide, the power was raised until its melting temperature was reached and a complete melt of europium bromide was formed; thereafter, the power input was reduced until the temperature was not high enough for the europium bromide to evaporate. The power to be delivered for melting the europium bromide was controlled in accordance with a preliminary experiment for its melting.

At the point in time when 60 minutes had passed since the start of melting the film-forming materials, the shutter above the crucibles loaded with cesium bromide was opened so that the formation (vapor deposition) of the matrix layer (CsBr layer) started (cesium bromide was vaporized at the temperature of 670° C.).

When the thickness of the matrix layer reached 50 μm, the supply of argon gas was so adjusted that the pressure (Ar gas pressure) in the vacuum chamber would be 1.0 Pa; at the same time, the power to europium bromide (or its crucibles) was raised to the level at which the molarity ratio of Eu/Cs in the phosphor layer would be 0.001:1 and an electric current was passed to the substrate holder heater so that the substrate 12 was heated to 100° C.; in addition, the shutter above the crucibles loaded with europium bromide was opened to start the formation of the phosphor layer.

When the thickness of the phosphor layer reached 650 μm, the DC source was switched off to stop the passage of an electric current to the crucibles while at the same time the passage of an electric current to the heater for the substrate 12 was stopped to end the formation of the phosphor layer.

Subsequently, dry air was introduced into the vacuum chamber until the internal pressure became atmospheric and the phosphor layer was left to cool in the chamber as it was open to the atmosphere. After the end of the cooling, the substrate 12 (conversion panel) was removed from its holder and recovered from the vacuum chamber.

The conversion panel 10 thus produced had the spherical crystal layer 14 which was 10 μm thick and the columnar crystal layer 16 which was 690 μm thick. To be more specific, this conversion panel 10 was such that the spherical crystal layer 14 was composed of the 10-μm thick matrix layer whereas the columnar crystal layer 16 was composed of the 40-μm thick matrix layer and the 650-μm thick phosphor layer.

The thickness of each layer was controlled by the evaporation time on the basis of the relationship between the evaporation time and film thickness as determined by a preliminary experiment.

The power to be delivered to europium bromide (or its crucibles) was controlled in accordance with the result as determined by a preliminary experiment on the power that had to be delivered to europium bromide in order to provide a Eu/Cs molarity ratio of 0.001:1.

Comparative Example 1

A conversion panel was prepared by repeating the procedure of Example 1, except that the pressure (of Ar gas) in the vacuum chamber during the formation of the phosphor layer was adjusted to 0.5 Pa.

The conversion panel produced did not have the spherical crystal layer 14 but had the columnar crystal layer 16 with a thickness of 700 μm. In other words, this conversion panel was such that each of the matrix and phosphor layers was composed of the columnar crystal layer 16.

Comparative Example 2

A conversion panel was prepared by repeating the procedure of Example 1, except that cesium bromide was melted and vaporized at the temperature of 660° C.

The conversion panel produced had the spherical crystal layer 14 which was 50 μm thick and the columnar crystal layer 16 which was 650 μm thick. To be more specific, this conversion panel was such that the spherical crystal layer 14 was solely composed of the matrix layer whereas the columnar crystal layer 16 was solely composed of the phosphor layer.

Comparative Example 3

A conversion panel was prepared by repeating the procedure of Example 1, except that cesium bromide was melted and vaporized at the temperature of 655° C.

The conversion panel produced had the spherical crystal layer 14 which was 60 μm thick and the columnar crystal layer 16 which was 640 μm thick. To be more specific, this conversion panel was such that the spherical crystal layer 14 was composed of the 50-μm thick matrix layer and the 10-μm thick phosphor layer whereas the columnar crystal layer 16 was composed of the 640-μm thick phosphor layer.

Example 2

A conversion panel 10 was prepared by repeating the procedure of Example 1, except that cesium bromide was melted and vaporized at the temperature of 665° C.

The conversion panel 10 thus produced had the spherical crystal layer 14 which was 30 μm thick and the columnar crystal layer 16 which was 670 μm thick. To be more specific, this conversion panel 10 was such that the spherical crystal layer 14 was composed of the 30-μm thick matrix layer whereas the columnar crystal layer 16 was composed of the 20-μm thick matrix layer and the 650-μm thick phosphor layer.

Example 3

A conversion panel 10 was prepared by repeating the procedure of Example 1, except that it took 5 minutes for the molarity ratio of Eu/Cs to reach 0.001:1 by delivering an increasing amount of power to europium bromide.

The conversion panel 10 thus produced had the spherical crystal layer 14 which was 30 μm thick and the columnar crystal layer 16 which was 670 μm thick. To be more specific, this conversion panel 10 was such that the spherical crystal layer 14 was composed of the 30-μm thick matrix layer whereas the columnar crystal layer 16 was composed of the 20-μm thick matrix layer and the 650-μm thick phosphor layer.

Example 4

A conversion panel 10 was prepared by repeating the procedure of Example 1, except that it took 15 minutes for the molarity ratio of Eu/Cs to reach 0.001:1 by delivering an increasing amount of power to europium bromide.

The conversion panel 10 thus produced had the spherical crystal layer 14 which was 30 μm thick and the columnar crystal layer 16 which was 670 μm thick. To be more specific, this conversion panel 10 was such that the spherical crystal layer 14 was composed of the 30-μm thick matrix layer whereas the columnar crystal layer 16 was composed of the 20-μm thick matrix layer and the 650-μm thick phosphor layer.

Example 5

A conversion panel 10 was prepared by repeating the procedure of Example 1, except that it took 120 minutes for the molarity ratio of Eu/Cs to reach 0.001:1 by delivering an increasing amount of power to europium bromide.

The conversion panel 10 thus produced had the spherical crystal layer 14 which was 30 μm thick and the columnar crystal layer 16 which was 670 μm thick. To be more specific, this conversion panel 10 was such that the spherical crystal layer 14 was composed of the 30-μm thick matrix layer whereas the columnar crystal layer 16 was composed of the 20-μm thick matrix layer and the 650-μm thick phosphor layer.

For each of the samples of conversion panel 10 that were prepared in Examples 3-5, the phosphor layer was inspected by the aforementioned ICP emission spectrometry; as it turned out, the phosphor layer in each sample had a region in which the Eu concentration (Eu/Cs molarity ratio) increased progressively.

Each of the conversion panels prepared in Comparative Examples 1-3 and in Examples 1-5 was evaluated for its performance in terms of the sensitivity for PSL, the number of point defects in the radiation image produced, and the adhesion (film adhesion) of the phosphor layer.

The following evaluation methods were employed.

[PSL Sensitivity]

Each of the conversion panels was placed in a cassette shielded from light and exposed to about 1 mR of X-rays at a tube voltage of 80 kVp.

After the exposure to X-rays, the conversion panel was recovered from the cassette in the dark and excited with semiconductor laser light (wavelength, 660 nm; 10 mV). The photostimulated luminescence emitted from the phosphor layer was measured with a photomultiplier tube after it was separated from the exciting light by passage through an exciting light cutoff filter (B410 of HOYA CORPORATION).

PSL evaluation was a relative one, with the result of Example 1 being taken as 100.

[Number of Point Defects]

Each of the conversion panels was placed in a cassette shielded from light and exposed to about 1 mR of X-rays at a tube voltage of 80 kVp.

After the exposure to X-rays, the conversion panel was processed as in the above-described measurement of photostimulated luminescence, to thereby read the radiation image (of uniform density) that was recorded on the panel.

The radiation image readout was reproduced on a display and the number of point defects (white dots) in the display's center area measuring 10×10 cm was counted visually.

A sample with not more than five point defects was considered to be acceptable.

[Film Adhesion]

A sample with some perceivable peel of the formed phosphor layer was rated "Poor";

A sample having no perceivable peel of the phosphor layer was rated "Fair" in the case where the phosphor layer peeled when the letter # was written on it with the center square grid measuring 3 cm on each side;

A sample experiencing no perceivable peel of the phosphor layer when the letter # was written on the phosphor layer with the center square grid measuring 3 cm on each side was rated "Good" in the case where the phosphor layer peeled when adhesive tape was attached to that letter and later pulled in a vertical direction;

A sample experiencing no peel of the phosphor layer under any of the conditions described above was rated "Excellent".

The results are shown in Table 1 below.

TABLE 1

| | Thickness of spherical crystal layer (μm) | Thickness of columnar crystal layer (μm) | Conditions of vapor deposition | | | | Performance | | |
|---|---|---|---|---|---|---|---|---|---|
| | | | Vaporizing temperature (°C.) | Substrate temperature (°C.) | Ar gas pressure (Pa) | Time (min) | PSL | No. of point defects | Film adhesion |
| CE1 | 0 | 700 | 670 | 100 | 0.5 | 0 | 100 | 2 | Poor |
| CE2 | 50 | 650 | 660 | 100 | 1.0 | 0 | 100 | 8 | Good |

TABLE 1-continued

| | Thickness of spherical crystal layer (μm) | Thickness of columnar crystal layer (μm) | Conditions of vapor deposition | | | | Performance | | |
|---|---|---|---|---|---|---|---|---|---|
| | | | Vaporizing temperature (° C.) | Substrate temperature (° C.) | Ar gas pressure (Pa) | Time (min) | PSL | No. of point defects | Film adhesion |
| CE3 | 60 | 640 | 655 | 100 | 1.0 | 0 | 100 | 8 | Good |
| EX1 | 10 | 690 | 670 | 100 | 1.0 | 0 | 100 | 2 | Good |
| EX2 | 30 | 670 | 665 | 100 | 1.0 | 0 | 100 | 2 | Good |
| EX3 | 30 | 670 | 665 | 100 | 1.0 | 5 | 100 | 1 | Excellent |
| EX4 | 30 | 670 | 665 | 100 | 1.0 | 15 | 100 | 0 | Excellent |
| EX5 | 30 | 670 | 665 | 100 | 1.0 | 120 | 95 | 1 | Excellent |

In all samples of conversion panel tested, the matrix layer was 50 μm thick and the phosphor layer was 650 μm thick.

In Table 1, "time" refers to the time it took for the molarity ratio of Eu/Cs to reach 0.001:1 by delivering an increasing amount of power to europium bromide.

As is clear from Table 1, each sample of the conversion panel 10 according to the present invention which included the matrix and phosphor layers, as well as the spherical crystal layer 14 and the columnar crystal layer 16, with the phosphor layer being formed solely in the columnar crystal layer 16, was a high-performance conversion panel which not only had very few point defects in the radiation image but also featured good adhesion. The samples of Examples 3-5, wherein the molarity ratio of Eu/Cs was allowed to reach 0.001:1 by delivering a progressively increasing amount of power to europium bromide, had the activator's concentration-increasing region and hence featured even better adhesion of the phosphor layer. The sample of Example 5 in which the power input was increased to the required level over 120 minutes had a PSL sensitivity of 95 which was lower than the values for the other samples of the invention; however, this level of PSL sensitivity would present no problem in practical applications.

In contrast, the sample of Comparative Example 1 did not have the spherical crystal layer 14 and hence had a problem with the adhesion of the phosphor layer. The sample of Comparative Example 2 in which the spherical crystal layer 14 was solely formed of the matrix layer and the columnar crystal layer 16 was solely formed of the phosphor layer, as well as the sample of Comparative Example 3 in which the phosphor layer was formed of the spherical crystal layer 14 were both inferior in that the crystals had grown abnormally on account of the particles of the activator (Eu), thus generating a great number of point defects in the radiation image that was produced.

From the foregoing results, the beneficiary effects of the present invention are apparent.

What is claimed is:

1. A radiation image conversion panel comprising:
   a phosphor layer which is formed by a vapor-phase deposition and is solely formed of columnar crystals;
   a matrix layer which is formed under said phosphor layer, is substantially free of an activator of a phosphor, and has a columnar crystal region and an underlying non-columnar crystal region; and
   a substrate which supports said matrix layer and said phosphor layer formed on said matrix layer,
   wherein said underlying non-columnar crystal region of said matrix layer is a spherical crystal layer having a spherical crystal structure.

2. The radiation image conversion panel according to claim 1, wherein said phosphor layer has an activator concentration-increasing region in which a concentration of said activator increases progressively from an interface with said matrix layer toward an outer surface of said phosphor layer.

3. The radiation image conversion panel according to claim 2, wherein said activator concentration-increasing region has a thickness ranging from 0.5 μm to a value corresponding to a thickness of said phosphor layer.

4. The radiation image conversion panel according to claim 2, wherein a rate at which said concentration of said activator changes in said activator concentration-increasing region is between $1 \times 10^{-7}$/μm and $5 \times 10^{-4}$/μm.

5. The radiation image conversion panel according to claim 1, further comprising:
   a protective layer having sufficient moisture resistance which is formed on said phosphor layer.

6. A process for producing a radiation image conversion panel having a phosphor layer, comprising:
   forming on or above a substrate a matrix layer which is substantially free of an activator of a phosphor; and
   forming said phosphor layer by a vapor-phase deposition,
   wherein formation of said phosphor layer is started after a crystal structure of an upper region of said matrix layer has changed from a non-columnar to a columnar,
   wherein said underlying non-columnar crystal region of said matrix layer is a spherical crystal layer having a spherical crystal structure.

7. The process for producing a radiation image conversion panel according to claim 6, wherein at a time when said formation of said phosphor layer has started, said activator of said phosphor is deposited in a smaller amount than a required value and thereafter said activator is deposited in a progressively increased amount until said required value is reached.

* * * * *